United States Patent [19]

Kan et al.

[11] Patent Number: 5,181,484
[45] Date of Patent: Jan. 26, 1993

[54] CAM TIMING CONTROL DEVICE FOR AUTOMOTIVE ENGINE

[75] Inventors: Toshiya Kan; Katsuhiko Sakamoto, both of Higashihiroshima, Japan

[73] Assignee: Mazda Motor Corporation, Hiroshima, Japan

[21] Appl. No.: 846,709

[22] Filed: Mar. 6, 1992

[30] Foreign Application Priority Data

Mar. 26, 1991 [JP] Japan ................................. 3-61467

[51] Int. Cl.$^5$ ................................................ F01L 1/34
[52] U.S. Cl. ................................. 123/90.17; 123/90.15
[58] Field of Search ............... 123/90.11, 90.15, 90.17

[56] References Cited

U.S. PATENT DOCUMENTS

| 3,978,829 | 9/1976 | Takahashi et al. | 123/90.15 |
| 4,302,985 | 12/1981 | Natkin | 123/90.15 |
| 4,481,912 | 11/1984 | Stwiorok et al. | 123/90.15 |
| 4,494,495 | 1/1985 | Nakamura et al. | 123/90.15 |
| 4,494,496 | 1/1985 | Nakamura et al. | 123/90.15 |
| 4,754,727 | 7/1988 | Hampton | 123/90.15 |
| 4,771,742 | 9/1988 | Nelson et al. | 123/90.17 |
| 4,856,465 | 8/1989 | Denz et al. | 123/90.15 |
| 4,909,194 | 3/1990 | Bauer | 123/90.15 |
| 4,928,640 | 5/1990 | Van Vuuren et al. | 123/90.17 |
| 4,967,701 | 11/1990 | Isogai et al. | 123/90.17 |
| 5,031,585 | 7/1991 | Muir et al. | 123/90.17 |
| 5,040,651 | 8/1991 | Hampton et al. | 123/90.15 |
| 5,097,804 | 3/1992 | Brune et al. | 123/90.17 |
| 5,133,310 | 7/1992 | Hitomi et al. | 123/90.15 |

Primary Examiner—E. Rollins Cross
Assistant Examiner—Thomas N. Moulis
Attorney, Agent, or Firm—Fish & Richardson

[57] ABSTRACT

A cam timing control device in an antomotive engine which used in a valve timing correcting device of a type wherein an electromagnetic force is used to change a cam timing. The cam timing control device is so designed that, in the event that a resistance to the change of the cam timing is high, the length of time during which an electric power is continuously supplied to the electromagnetic coil is prolonged.

9 Claims, 4 Drawing Sheets

CAM TIMING CONTROL DEVICE FOR AUTOMOTIVE ENGINE

BACKGROUND OF THE INVENTION

1. Field of the Invention

The present invention generally relates to a cam timing control device for use with an automotive internal combustion engine and, more particularly, to the cam timing control device of a type wherein an electromagnetic force is utilized to change the cam timing to secure a high response to a switching signal used to change the cam timing.

It is to be noted that the term "cam timing" herein used is to be understood as meaning an operational timing of the cam, drivingly associated with an automotive fuel intake valve, relative to the selective opening and closure of such fuel intake valve.

2. Description of the Prior Art

In an automotive engine system, for selectively opening and closing the intake and exhaust valves, it is a general practice to drive the camshaft synchronously with the engine by the utilization of a drive produced in the engine. In this system, it has been suggested to change the cam timing in dependence on the engine operating condition, for example, one or both of the load imposed on the engine and the engine speed, so that a valve timing between the intake valve and the exhaust valve can be adjusted to increase the operational efficiency of the engine as a whole.

An example of conventional cam timing control devices used for changing the cam timing is known to be of a hydraulic type wherein a hydraulic mechanism is utilized.

Also, the U.S. Pat. No. 4,841,924, issued Jun. 27, 1989, discloses another example of the conventional cam timing control devices, which is so designed as to change the cam timing electrically.

More specifically, the above mentioned patent discloses an electrically actuated cam timing control device for varying the angular phase relation between the camshaft and the crankshaft. This known cam timing control device comprises an engine timing pulley mounted on the camshaft for rotation coaxially of the camshaft over a predetermined angle and a biasing spring interposed between the timing pulley and the camshaft for biasing the camshaft in a retarding direction by means of a coil spring. The known cam timing control device also comprises a clutch mechanism adapted to be actuated, when an electric power is supplied from a battery to an electromagnetic coil, to produce a frictional force necessary to advance the camshaft when balanced with the biasing force of the coil spring.

The electrically actuated cam timing control device of the type referred to above is so designed that the balance between the frictional force generated in the clutch mechanism and the biasing force of the coil spring is utilized to change the angular phase relationship between the crankshaft and the camshaft, that is, the cam timing. Accordingly, the following problems have been found inherent in this known cam timing control device.

Specifically, during a particular engine operating condition, such as, for example, a high load engine operating condition or a high speed engine operating condition, in which a resistance is relatively high due to a rotational inertia force, the camshaft tends to be halted at a position generally intermediate between predetermined advanced and retarded positions relative to the timing pulley with the response to the switching consequently lowered. Also, when the voltage of an electric power source, for example, the battery, is low and/or the engine temperature is high, a resistance on the side of the electromagnetic coil is high and, therefore, the response to the switching tends to be lowered.

In addition, since an electric power from the battery is merely supplied to the electromagnetic coil, not only does the electrically actuated cam timing control device of the type referred to above tend to consume a relatively large amount of the electric power, but also the alternator generally driven by the engine tends to be loaded. In particular, where the load on the alternator is high, the engine is correspondingly loaded, resulting in a reduction in mileage.

Furthermore, the structure wherein the frictional force generated in the clutch mechanism then actuated is balanced with the biasing force of the coil spring to advance the camshaft has a problem in that the frictional force of the clutch mechanism tends to increase the internal resistance in the engine to such an extent as to result in a reduction in mileage and also to result in a reduction in engine performance such as a resistance to vibrations during an idling operation and engine troubles.

In order to secure the favorable engine performance and the favorable mileage, it may be contemplated to lower the voltage to be supplied to the electromagnetic coil. However, this method would result in a problem in that the length of time during which the change of the cam timing is taking place during a normal engine operating condition will be prolonged. Once this occurs, a proper cam timing cannot be secured and, hence, the engine will not provide a desired output drive, resulting in a reduction in drivability of an automotive vehicle.

SUMMARY OF THE INVENTION

In view of the foregoing, the present invention has been devised with a view to substantially eliminating the above discussed problems inherent in the prior art cam timing control devices and is intended to provide an improved cam timing control device for the automotive internal combustion engine which is effective to secure a high response to the switching of the cam timing and, also, to minimize the electric power consumption while permitting the automotive engine to exhibit a favorable engine performance and a favorable mileage.

In order to accomplish the foregoing object, the present invention provides a cam timing control device which comprises a valve timing correcting device wherein an electromagnetic force is used to change the cam timing, said correcting device including an electromagnetic coil, the length of time over which an electric power is supplied to the electromagnetic coil being prolonged in the event that a resistance to the switching of the cam timing is high.

Where the electric power consumption is desired to be reduced on one hand and, on the other hand, the favorable mileage and the favorable engine performances are desired to be secured, this can be accomplished by continuously supplying the electric power to the electromagnetic coil at the time of change of the cam timing thereby to advance or retard the cam shaft and by subsequently applying a voltage, controlled to be of a value lower than that used during the continuous supply thereof, to the electromagnetic coil to retain the camshaft at the advanced or retarded position. In the event that the resistance to the switching of the camshaft is high, the length of time over which the electric power is continuously supplied to the electromagnetic coil may be prolonged.

Specifically, where the engine speed is high, the continuous supply of the electric power to the electromagnetic coil is effected at the time of change of the cam timing, followed by the control of the subsequent power supply with the use of a voltage lower than that used during the continuous supply thereof, and, on the other hand, the length of time over which the continuous supply of the electric power to the electromagnetic coil is effected is prolonged in proportion to the engine speed.

Also, where the voltage of the electric power source is low, the continuous supply of the electric power to the electromagnetic coil is effected at the time of change of the cam timing, followed by the control of the subsequent power supply with the use of a voltage lower than that used during the continuous supply thereof, and, on the other hand, the length of time over which the continuous supply of the electric power to the electromagnetic coil is effected is prolonged in proportion to the voltage remaining in the power source.

Again, where the temperature of the engine represented by the temperature of a coolant water used to cool the engine is high, the continuous supply of the electric power to the electromagnetic coil is effected at the time of change of the cam timing, followed by the control of the subsequent power supply with the use of a voltage lower than that used during the continuous supply thereof, and, on the other hand, the length of time over which the continuous supply of the electric power to the electromagnetic coil is effected is prolonged in proportion to the temperature of the engine.

By advancing or retarding the camshaft by the continuous supply of the electric power to the electromagnetic coil at the time of change of the cam timing, subsequently retaining the camshaft at the advanced or retarded position by the supply of an electric power controlled to a value lower than that during the continuous supply thereof and, in the event that the switching resistance is high, prolonging the length of time over which the continuous supply of the electric power to the electromagnetic coil, not only can the electric power consumption be minimized as a whole, but also the frictional force generated in the clutch mechanism does not provide a resistance to the engine during the retention of the camshaft at the advanced or retarded position and, therefore, the mileage and the engine performance will not be adversely affected and a high response to the switching of the cam timing can be secured as compared with the case in which the voltage to be supplied is merely set to a low value.

BRIEF DESCRIPTION OF THE DRAWINGS

This and other objects and features of the present invention will become readily understood from the following description of a preferred embodiment taken with reference to the accompanying drawings, in which.

DETAILED DESCRIPTION OF THE EMBODIMENT

Figure 1:
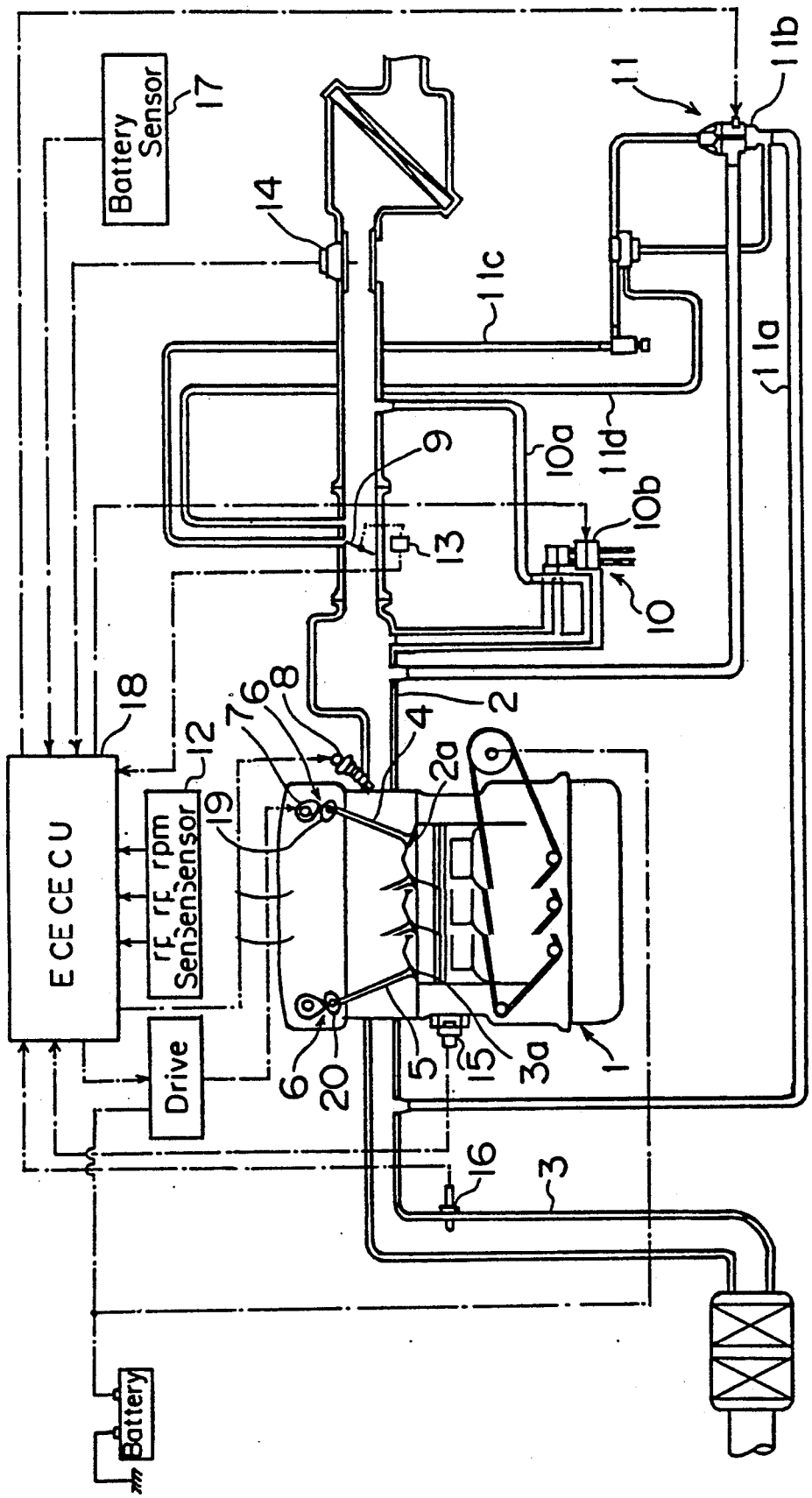
FIG. 1 is a schematic sectional view of an automotive power plant utilizing a cam timing control device according to the present invention.

Referring first to FIG. 1, an automotive power plant shown therein comprises an internal combustion engine 1 of double-overhead-camshaft (DOHC) model. The DOHC engine 1 has a combustion chamber defined therein in any known manner and communicated through an intake port 2a with an intake passage 2 and through an exhaust port 3a with an exhaust passage 3. As is well known to those skilled in the art, the intake port 2a is adapted to selectively opened and closed by an intake valve 4 and the exhaust port 3a is also adapted to be selectively opened and closed by an exhaust valve 5 at a timing generally opposite to the timing of closure or opening of the intake port 2a. The opening and closing of each of the intake and exhaust ports 2a and 3a is in practice controlled in any known manner by a respective cam mechanism 6 which is synchronously driven by the engine 1 in any known manner to drive a respective cam member 19 or 20 associated drivingly with the intake or exhaust valve 4 or 5.

One of the cam mechanisms 6 which is associated with the intake valve 4 is provided with a cam timing control device 7 operable to change a cam timing in dependence on an engine operating condition. Specifically, the cam mechanism 6 associated with the intake valve 4 is in practice mounted on one end of a camshfaft not shown, but in a manner which may be similar to that disclosed in U.S. Pat. No. 4,841,924 referred to hereinbefore.

The intake passage 2 includes a fuel injector 8 for injecting fuel into the combustion chamber through the intake port 2a and, also, a throttle valve 9 disposed upstream of the fuel injector 8 with respect to the direction of flow of air towards the combustion chamber, said throttle valve 9 being capable of assuming one of full open and substantially closed positions in response to the position of a well-known foot-operated accelerator pedal (not shown). The intake passage 2 has a bypass passage 10a bypassing the throttle valve 9 and including an idling speed control valve 10b. The bypass passage 10a and the idling speed control valve 10b altogether constitute a idling speed control unit 10 operable to adjust the amount of air by regulating the idling speed control valve 10b during an idling operation of the engine 1 so that the engine speed can be controlled to a predetermined value appropriate to the idling operation.

The illustrated automotive power plant also comprises an exhaust gas recirculating (EGR) system 11. This EGR system 11 comprises an EGR passage 11a extending from the intake passage 2 to the exhaust passage 3 while bypassing the combustion chamber in the engine 1, an EGR valve assembly 11b disposed on the EGR passage 11a, and a parallel circuit of suction passages 11c and 11d through which a negative pressure necessary to selectively open and close the EGR valve assembly 11b can be supplied to the EGR valve assembly 11b. As is well known to those skilled in the art, the EGR system 11 operates to recirculate a portion of exhaust gases within the exhaust passage 3 back to the intake passage 2 to control the state of combustion taking place within the combustion chamber.

The amount of fuel injected by fuel injector 8 into the combustion chamber, the ignition timing, the idling speed and the amount of the exhaust gases to be recirculated from the exhaust passage 4 to the intake passage 2 are all controlled by a control unit (ECU) 18. More specifically, this control unit 18 is adapted to receive a rpm signal indicative of the engine speed detected by an rpm sensor 12, a throttle signal indicative of the opening of the throttle valve 9 detected by a throttle sensor 13, an air signal indicative of the amount of air flowing through the intake passage 2 and detected by an airflow sensor 14, a temperature signal indicative of the temperature of a coolant water used to cool the engine 1 and detected by a temperature sensor 15, an oxygen signal indicative of the concentration of oxygen in the exhaust gases detected by an oxygen sensor 16 and a battery signal indicative of the voltage of a battery detected by a battery sensor 17. As will be described later, upon receipt of these signals from the various sensors 12 to 17, the control unit 18 performs an intended calculation and then, based on a result of the calculation, provides drive signals to the fuel injector 8, the idling speed control valve 10b and the EGR valve assembly 11b, respectively.

The automotive power plant so far described above is well known to those skilled in the art and may be of any known construction. However, in accordance with the present invention, based on the result of the calculation performed by the control unit 18, the latter also provides a command which is applied through a drive circuit to the cam timing control device 7 so that an electromagnetic actuator 30 (FIG. 3) forming a part of the cam timing control device 7 can be powered to generate an electromagnetic force necessary to control the switching of the cam timing relative to the intake valve 4.

According to the present invention, the switching of the cam timing is carried out by effecting a continuous supply of an electric power to the electromagnetic actuator, that is, supplying a voltage of 100% in duty ratio to the electromagnetic actuator, at the time the cam timing is desired to be changed, and by subsequently supplying to the electromagnetic actuator a retaining voltage which is lower than that applied during the continuous supply, that is, controlling the duty ratio of the voltage. Also, where a resistance to the change of the cam timing is high, the length of time during which the continued supply of the voltage to the electromagnetic actuator is effected is prolonged and, at the same time, the duty ratio of the retaining voltage is increased.

Figure 2:
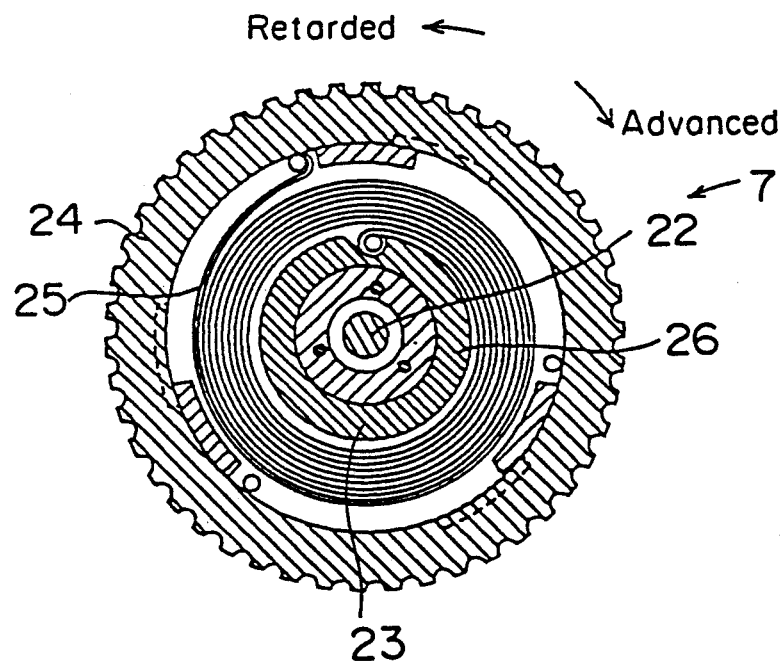
FIG. 2 is a transverse sectional view of the cam timing control device.

The details of the cam timing control device 7 will now be described with particular reference to FIGS. 2 and 3. The cam timing control device 7 comprises a generally round support plate 21 secured by means of a set bolt 22 coaxially to that end of the camshaft (not shown), having the cam member 19 mounted thereon, for rotation together therewith, and a drum 23 mounted on the support plate 21 for rotation together with the support plate 21. A timing pulley 24 drivingly coupled with a crank pulley (not shown) through a timing belt (not shown) is mounted on the drum 23 for rotation over a predetermined angle about the longitudinal axis of the camshaft relative to the drum 23. The drum 23 coupled with the camshaft is normally biased in a retarding direction, required to retard the cam timing, by means of a coil spring 25 housed within a space defined between the timing pulley 24 and the drum 23. The drum 23 has an inner peripheral surface lined, or otherwise secured, with a friction liner 26 forming a part of a clutch mechanism 28, and a pair of brake shoes 27 forming different parts of the clutch mechanism 28 are engageable with circumferentially spaced different portions of the friction liner 26.

The brake shoes 27 are adapted to be selectively brought into engagement with and disengaged from the friction liner 26 and can, for this purpose, be moved in respective directions opposite to each other and generally radially of the drum 23. The brake shoes 27 are mounted rigidly on, or otherwise formed integrally with, respective links 29 which are pivotally connected together at a point of pivot 29a so that the links 29 can move relative to each other in a manner similar to a pair of scissors. Respective ends of the links 29 remote from the associated brake shoes 27 are pivotally connected to corresponding coaxial plungers 31 of the electromagnetic actuator 30, which plungers 31 are movable in respective directions counter to each other between projected and retracted positions.

Figure 3:
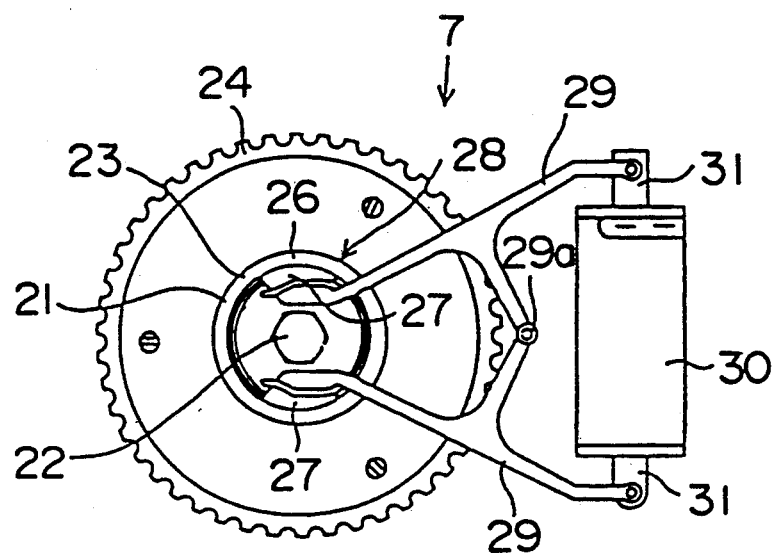
FIG. 3 is an end view of the cam timing control device.

In the construction particularly shown in FIG. 3, when the electromagnetic actuator 30 is electrically energized or powered, the coaxial plungers 31 are driven towards the retracted positions to bring the associated brake shoes 27 into frictional contact with the friction liner 26 so that the drum 23 and, hence, the camshaft can be advanced against the biasing force of the coil spring 25 by the effect of a frictional force exerted on the drum 23 by the frictional engagement between the brake shoes 27 and the friction liner 26. It is to be noted that the extent of advance of the camshaft, that is, the angle over which the camshaft is angularly displaced in the advancing direction, depends on the magnitude of the frictional force generated between the friction liner 26 and the brake shoes 27, that is, the balance between the frictional force so generated and the biasing force exerted by the coil spring 25.

As hereinbefore mentioned, the timing pulley 24 is drivingly coupled with the crank pulley rigid on the crankshaft so as to be driven by the engine 1 in synchronism with the revolution of the crankshaft. Therefore, once the angular phase relationship between the timing pulley 24 and the drum 23 is varied, the extent of advance or retardation appropriate to the varied angular phase relationship can be determined.

The cam timing control device according to the present invention operates in the following manner.

When and so long as the engine 1 is in operation, all of the rpm signal indicative of the engine speed, the throttle signal indicative of the opening of the throttle valve 9, the air signal indicative of the amount of air flowing through the intake passage 2, the temperature signal indicative of the temperature of the coolant water used to cool the engine 1, the oxygen signal indicative of the concentration of oxygen contained in the exhaust gases and the battery signal indicative of the voltage of the battery are supplied to the control unit 18 from the rpm sensor 12, the throttle sensor 13, the air-flow sensor 14, the temperature sensor 15, the oxygen sensor 16 and the battery sensor 17, respectively. Upon receipt of those signals from the various sensors 12 to 17, the control unit 18 executes a calculation to determine, and then output respective control signals indicative of, the amount of fuel to be injected, the fuel injecting timing, the ignition timing, the idling speed desired to be attained, and the amount of the exhaust gases to be actually recirculated into the intake passage 2, all of which are appropriate to a particular engine operating condition. The control signals emerging from the control unit 18 are sequentially applied to the fuel injector 9 to cause the latter to inject the fuel into the combustion chamber in a quality appropriate to the particular engine operating condition at the proper fuel injecting timing; to an ignition distributor to cause an ignition coil in the distributor to generate a high voltage to be applied to the ignition plug thereby to ignite an air-fuel mixture within the combustion chamber; to the idling speed control valve 10b of the idling speed control unit 10 during an idling operation of the engine so that the engine speed can attain the desired idling speed; and to the EGR valve assembly 11b to cause the latter to supply the required amount of the exhaust gases into the intake passage 2. The foregoing operation of the control unit 18 has no concern with the subject matter of the present invention and, therefore, no further detail thereof is herein reiterated for the sake of brevity.

Not only does the control unit 18 formulate a switching signal necessary to change the cam timing by continuously supplying the voltage of 100% in duty ratio to the electromagnetic actuator 30 at the time the cam timing is desired to be changed and then by supplying the retaining voltage lower than the voltage of 100% in duty ratio to the electromagnetic actuator 30, but also the control unit 18 executes the calculation using the engine speed Ne, the engine coolant temperature thw and the battery voltage +B so that the higher any one of the engine speed Ne and the engine coolant temperature thw or the lower the battery voltage +B, the larger the length of time T during which the application of the voltage of 100% in duty ratio to the electromagnetic actuator 30 is, and also so that the switching signal can be corrected to have an increased duty ratio during the supply of the retaining voltage. The switching signal emerging from the control unit 18 is applied to the electromagnetic actuator 30.

In response to the switching signal, the electromagnetic actuator 30 in the cam timing control device 7 is electrically powered with the plungers 31 consequently moved to the respective retracted positions, causing the brake shoes 17 to be brought into frictional contact with the friction liner 26 in the drum 23 thereby to actuate the clutch mechanism 28. With the clutch mechanism 28 so actuated, when the frictional force generated as a result of the frictional contact between the friction liner 26 and the brake shoes 27 is balanced with the biasing force exerted by the coil spring 25, the camshaft is advanced relative to the timing pulley. On the other hand, in the event that the switching signal is no longer generated, the clutch mechanism 28 is not actuated with no frictional force generated consequently and, therefore, the camshaft can be retarded relative to the timing pulley by the action of the biasing force of the coil spring 25.

Figure 4:
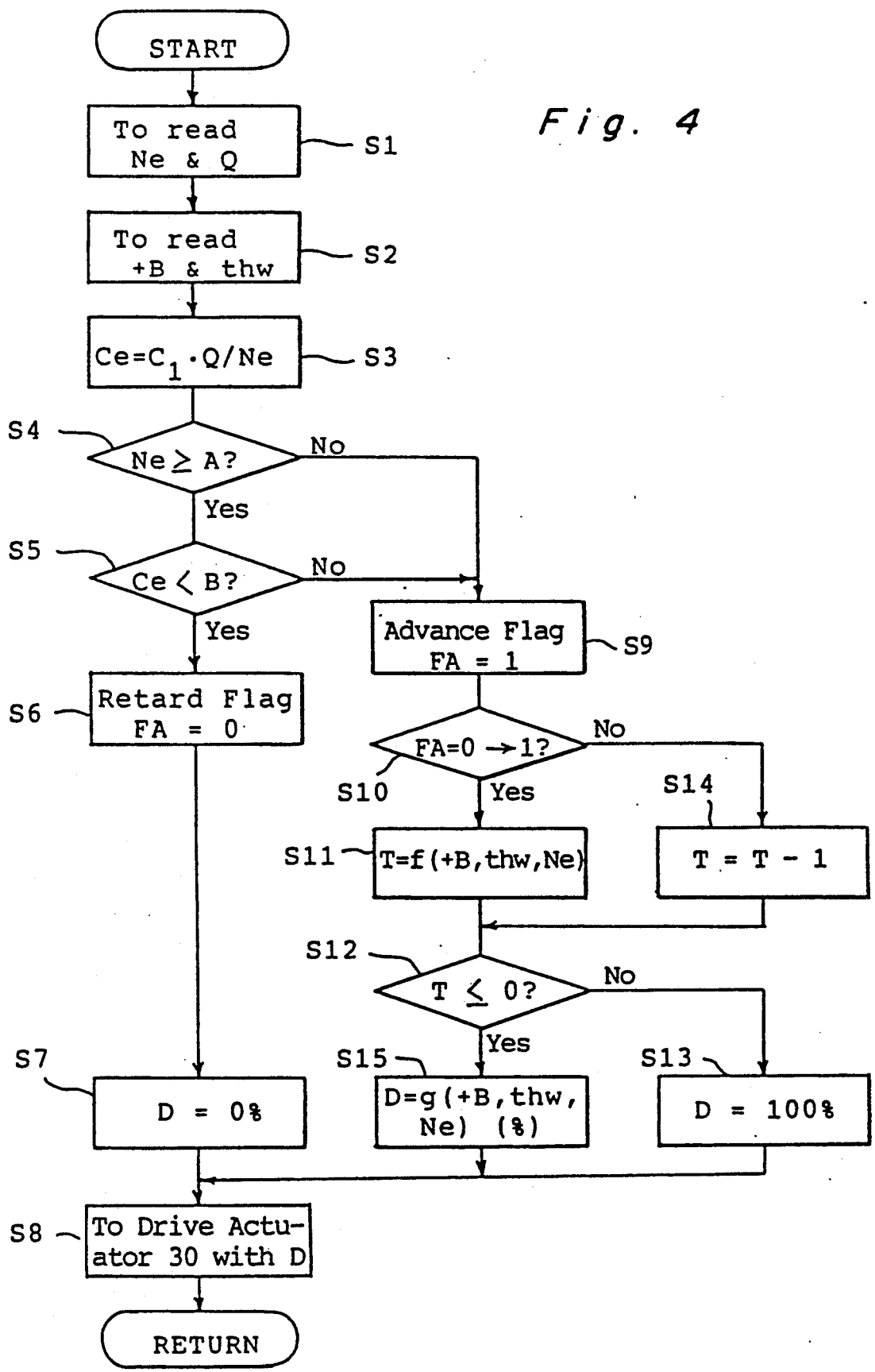
FIG. 4 is a flowchart showing the sequence of operation of a control unit used to control the cam timing control device.

The specific manner in which the cam timing is changed will now be described with reference to the flowchart shown in FIG. 4 and also with reference to FIGS. 5 to 11.

The control of the cam timing is carried out in the following sequence. Subsequent to the start of a program, the engine speed Ne and the amount Q of air being sucked through the intake passage 2 are read in at step S1. At subsequent step S2, the battery voltage +B and the engine coolant temperature thw are read in. The program thereafter goes to a calculation block S3 at which a load Ce on the engine 1 is calculated using the following equation $$Ce = C_1 \cdot Q / Ne$$

wherein $C_1$ represents a coefficient.

Subsequent to the calculation at step S3, a decision is made successively at step S4 and step S5 to determine if the engine speed Ne is equal to or higher than a predetermined value A and if the load Ce on the engine is lower than a predetermined value B, respectively. In the event that the engine speed Ne is equal to or higher than the predetermined value A and, at the same time, the engine load Ce is lower than the predetermined value B, it means that the engine 1 is being operated in a condition required for the cam timing to be retarded and, in such case, a retard flag FA is set to zero at step S7 so that the duty ratio D of the switching signal can be set to 0%. Thereafter, at step S8, the switching signal of 0% in duty ratio D is used to drive the electromagnetic actuator 30, that is, no switching signal is generated, thereby to retard the cam timing.

Figure 5:
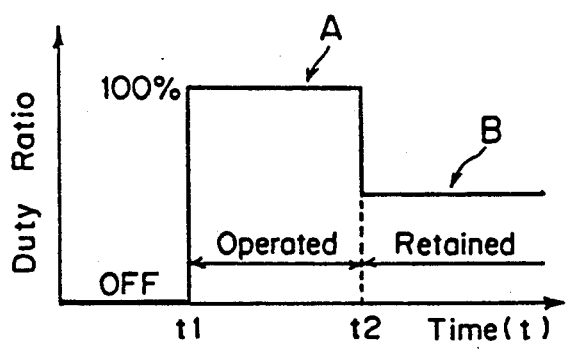
FIG. 5 illustrates a waveform of a switching signal applied in the cam timing control device.

On the other hand, in the event that either the engine speed Ne is lower than the predetermined value A or the engine load Ce is higher than the predetermined value B, that is, in the event that the engine is being operated in a condition required for the cam timing to be advanced, an advance flag FA is set to 1 at step S9 at a timing t1 shown in FIG. 5, followed by a decision step S10 to determine if the status of the advance flag FA has changed from 0 to 1. Since the status of the advance flag FA changes from 0 to 1 immediately after the engine 1 has been operated in the condition required for the cam timing to be advanced, the length of time during which the continued power supply is to be effected, that is, the length of time T during which the 100% duty is to be executed, is either calculated using the battery voltage +B, the engine coolant temperature thw and the engine speed Ne at step S11, or read out from a map. Preferably, the length of time T is chosen to be within the range of 0.5 to 1.0 seconds.

Figure 6:
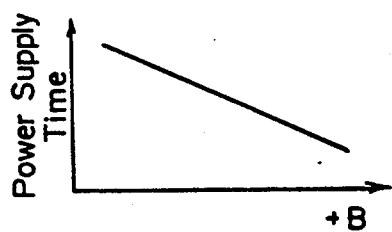
FIG. 6 is a schematic graph showing a relationship between a battery voltage and a continued power supply time in the cam timing control device.
Figure 7:
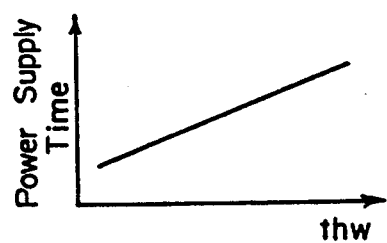
FIG. 7 is a schematic graph showing a relationship between the engine coolant temperature and the continued power supply time in the cam timing control device.
Figure 8:
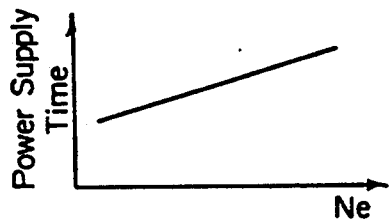
FIG. 8 is a schematic graph showing a relationship between the engine speed and the continued power supply time in the cam timing control device.

Specifically, as shown in FIGS. 6 to 8, the lower the battery voltage +B is, the higher the engine coolant temperature thw is, or the higher the engine speed Ne is, the larger the length of time T is chosen during the execution of the program step S11. This is partly because a driving force exerted by the electromagnetic actuator 30 is low when the battery voltage +B is low and partly because the biasing force of the coil spring 25 is high as a result of a thermal expansion thereof when the engine coolant temperature thw is high. Once the length of time T has been chosen, the duty ratio D thereof is set to 100% at step S13 and the switching signal having its duty ratio D so set to 100% is applied to the electromagnetic actuator 30 at step S8, thereby actuating the clutch mechanism 28 to apply the frictional force to the drum 23 through the engagement of the brake shoes 27 with the friction liner 26.

As hereinbefore described, the length of time T is determined to be of a relatively large value where the resistance to the switching of the cam timing is relatively high in dependence on the engine operating condition. Therefore, during the length of time T so determined, the camshaft can be assuredly driven angularly in the advancing direction in accordance with a rotation of the drum 23 and the opening of the intake valve 4 can be advanced. (See A in FIG. 5.)

Subsequent to the start of the continued power supply to the electromagnetic actuator 30, the length of time T is progressively decremented by one at step S14, followed by a decision at step S12 to determine if the length of time T has become a value equal to or smaller than zero. Should the length of time T have become zero or smaller, that is, in the event that the length of time T has passed, the duty ratio D is, at step S15, determined in dependence on the battery voltage +B, the engine coolant temperature thw and the engine speed Ne so that the electromagnetic actuator 30 can be eventually driven according to a duty drive scheme, i.e., the electromagnetic actuator 30 can be repeatedly switched on (100% duty ratio) and off (0% duty ratio). This duty drive scheme is intended to retain the drum 23 (and, hence, the camshaft), once advanced by the application of the switching signal of 100% in duty ratio, at the advanced position and is employed for the purpose of minimizing an electric power consumption since the driving force necessary to retain the drum 23 at the advanced position suffices to be lower than the driving force required to advance the drum 23.

Figure 9:
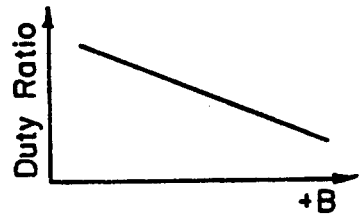
FIG. 9 is a schematic graph showing a relationship between the battery voltage and the duty ratio of a retaining voltage.
Figure 10:
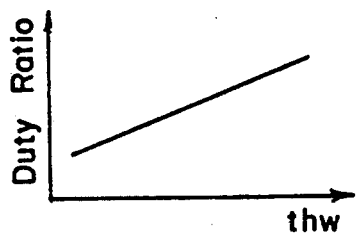
FIG. 10 is a schematic graph showing a relationship between the engine coolant temperature and the duty ratio of the retaining voltage.
Figure 11:
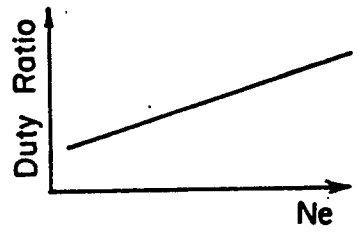
FIG. 11 is a schematic graph showing a relationship between the engine speed and the duty ratio of the retaining voltage.

More specifically, at step S15, and as shown in FIGS. 9 to 11, the duty ratio D is chosen to be of a high value (%) if the battery voltage +B is relatively low, the engine coolant temperature thw is relatively high and/or the engine speed Ne is relatively high. The switching signal having the duty ratio D so chosen is subsequently applied at step S8 to the electromagnetic actuator 30. A reason for the determination of the duty ratio D in dependence on the battery voltage +B, the engine coolant temperature thw and/or the engine speed Ne is basically the same as that for the determination of the length of time T during which the switching signal of 100% in duty ratio is applied to the electromagnetic actuator 30. In this way, the electromagnetic actuator 30 can be controlled on the duty control scheme, i.e., repeatedly switched on and off, in dependence on the battery voltage +B, the engine coolant temperature thw and/or the engine speed Ne, making it possible to retain the clutch mechanism 28 in an actuated condition with a minimized electric power consumption (See A in FIG. 5).

Where the engine operating condition changes from a condition in which the cam timing has been advanced to a different condition in which the cam timing is to be retarded, the program flow from step S1 to S8 is executed to release the clutch mechanism 28 to retard the cam timing.

With the foregoing cam timing control device for the automotive engine according to the present invention, the length of time during which the electric power is supplied to the electromagnetic actuator 30 is prolonged in the event that the resistance to the switching of the cam timing is relatively high, such as occurring when the engine speed is high, when the temperature of the engine represented by the engine coolant temperature is high, and/or when the battery voltage is low. Therefore, the clutch mechanism 28 as a whole can provide the frictional force of a magnitude greater than the resistance to the switching of the cam timing, thereby facilitating a quick change of the angular phase of the cam shaft to a required timing with no possibility of the camshaft being halted at a position generally intermediate between the advanced and retarded positions.

As hereinbefore described, the cam timing control device according to the present invention is so designed that the camshaft can be advanced by the continuous supply of the electric power to the electromagnetic actuator 30 at the time the cam timing is desired to be changed and subsequently retained at the advanced position by the application of the lower voltage after the duty ratio of such lower voltage has been controlled. Therefore, the system as a whole can contribute to a reduction in electric power consumption.

The cam timing control device is also so designed that, when the clutch mechanism 28 is retained, the camshaft can be retained at the advanced position by the supply of the lower voltage after the duty cycle of such lower voltage has been controlled. Therefore, the frictional force generated in the clutch mechanism 28 does not impose any substantial resistance to the engine and will not adversely affect the engine fuel consumption and the engine performance. As compared with the case in which the voltage to be supplies is merely chosen to be of a low value, the high response to the switching can be obtained.

From the foregoing description of the preferred embodiment of the present invention, it has now become clear that, in the valve timing correcting device of a type wherein the cam timing is changed by the utilization of the electromagnetic force, the cam timing can be quickly changed since the supply of the electric power to the electromagnetic coil is prolonged in the event that the resistance to the switching of the cam timing is relatively high. It has also become clear that not only can the electric power consumption be minimized, but also any possible adverse influence on the fuel consumption and the engine performance can be avoided while a high responsibility is secured, provided that the supply of the electric power to the electromagnetic coil is carried out continuously at the time change of the cam timing and the control is subsequently made with the retaining voltage controlled to be of a lower value than the voltage used during the continuous supply of the electric power. As a matter of course, the length of time during which the electric power is supplied to the electromagnetic coil is prolonged in the event that the resistance to the switching of the cam timing is relatively high.

Although the present invention has been described in connection with the preferred embodiment thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. In a valve timing correcting device of a type wherein an electromagnetic force is used to change a cam timing, a cam timing control device for use in association with an automotive engine which comprises control means operable, in the event that a resistance to the change of the cam timing is high, to prolong the length of time during which an electric power is continuously supplied to the electromagnetic coil.

2. The cam timing control device as claimed in claim 1, wherein, while the electric power is continuously supplied to the electromagnetic coil in the event that the resistance to the change of the cam timing is high, a retaining electric power lower than that used during the continuous supply of the electric power to the electromagnetic coil is subsequently applied to the electromagnetic coil and, on the other hand, said length of time is prolonged with an increase in engine speed.

3. The cam timing control device as claimed in claim 1, wherein, while the electric power is continuously supplied to the electromagnetic coil in the event that the resistance to the change of the cam timing is high, a retaining electric power lower than that used during the continuous supply of the electric power to the electromagnetic coil is subsequently applied to the electromagnetic coil and, on the other hand, said length of time is prolonged with a lowering of a power source voltage.

4. The cam timing control device as claimed in claim 1, wherein, while the electric power is continuously supplied to the electromagnetic coil in the event that the resistance to the change of the cam timing is high, a retaining electric power lower than that used during the continuous supply of the electric power to the electromagnetic coil is subsequently applied to the electromagnetic coil and, on the other hand, said length of time is prolonged with an increase of a temperature of the engine.

5. In a valve timing correcting device of a type wherein an electromagnetic force is used to change a cam timing, a cam timing control device for use in association with an automotive engine which comprises control means operable, in the event that a resistance to a retention is high, to increase an electric power to be continuously supplied to the electromagnetic coil at a retained position.

6. The cam timing control device as claimed in claim 5, wherein, while the electric power is continuously supplied to the electromagnetic coil in the event that the resistance to the retention is high, a retaining electric power lower than that used during the continuous supply of the electric power to the electromagnetic coil is subsequently applied to the electromagnetic coil and, on the other hand, said electric power to be continuously supplied is increased with an increase in engine speed.

7. The cam timing control device as claimed in claim 5, wherein, while the electric power is continuously supplied to the electromagnetic coil in the event that the resistance to the retention is high, a retaining electric power lower than that used during the continuous supply of the electric power to the electromagnetic coil is subsequently applied to the electromagnetic coil and, on the other hand, said electric power to be continuously supplied is increased with a lowering of a power source voltage.

8. The cam timing control device as claimed in claim 5, wherein, while the electric power is continuously supplied to the electromagnetic coil in the event that the resistance to the retention is high, a retaining electric power lower than that used during the continuous supply of the electric power to the electromagnetic coil is subsequently applied to the electromagnetic coil and, on the other hand, said electric power to be continuously supplied is increased with an increase of a temperature of the engine.

9. In a valve timing correcting device of a type wherein an electromagnetic force is used to change a cam timing, a cam timing control device for use in association with an automotive engine which comprises control means operable, in the event that a resistance to the change of the cam timing is high, to prolong the length of time during which an electric power is continuously supplied to the electromagnetic coil and, also, in the event that a resistance to a retention is high, to increase an electric power to be continuously supplied to the electromagnetic coil at a retained position.

* * * * *